(No Model.)

T. E. WARE.
BELL FOR BICYCLES.

No. 320,100. Patented June 16, 1885.

Witnesses:
W. B. Masson.
L. C. Hills.

Inventor:
Theodore Edward Ware
by E. E. Masson
atty.

UNITED STATES PATENT OFFICE.

THEODORE EDWARD WARE, OF CLIFTON, BRISTOL, COUNTY OF GLOUCESTER, ENGLAND.

BELL FOR BICYCLES.

SPECIFICATION forming part of Letters Patent No. 320,100, dated June 16, 1885.

Application filed November 11, 1884. (No model.) Patented in England May 10, 1884, No. 7,556, and in France October 31, 1884, No. 165,129.

*To all whom it may concern:*

Be it known that I, THEODORE EDWARD WARE, a subject of her Majesty the Queen of Great Britain, residing at Clifton, Bristol, in the county of Gloucester, England, have invented new and useful Improvements in Bells for Use on Bicycles and for other Similar Uses, (for which I have obtained a patent in Great Britain, No. 7,556, dated May 10, 1884, and a patent in France, dated October 31, 1884, No. 165,129,) of which the following is a specification.

My invention relates to bells for use on bicycles and tricycles and for other similar uses, for the purpose of giving a signal or alarm; and my said invention consists in constructing the bell in such a manner that it may be readily silenced or the signal given and the bell kept ringing by reversing the positions of the said bell.

Figure 1:
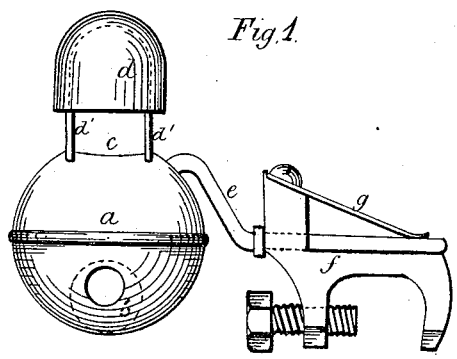
Figure 2:
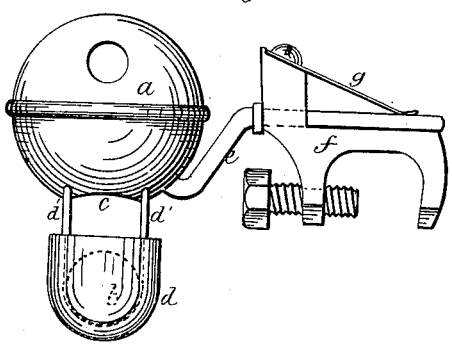
Figure 3:
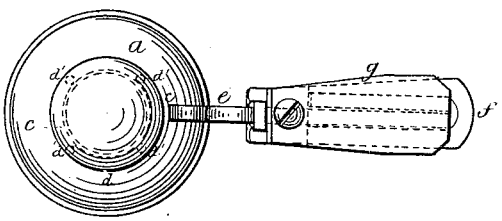

In the drawings, Figure 1 is a side elevation of one of my improved bells in position for ringing. Fig. 2 is a side elevation of one of my improved bells silenced. Fig. 3 is a plan view of Fig. 1.

Like letters indicate like parts in all the figures.

In carrying out my invention I employ a bell, $a$, of spherical or other suitable form, containing a ball, $b$, the said ball being set in motion and the bell rung by the motion of the bicycle or other object to which the bell is attached. An aperture or opening, $c$, is formed in the upper half of the bell $a$, sufficiently large to admit of the passage of the ball $b$, and over the said opening $c$ is fixed to or formed on the said bell a cup, $d$, or other suitable receptacle for containing the ball. The said cup $d$ may be of any suitable material and fixed to the said bell by standards $d'$, or in any other suitable manner which will prevent the escape of the ball in passing from the bell to the cup. When the ball $b$ is in the bell $a$, as shown in Fig. 1, the said ball will be set in motion by the vibration or movement of the bicycle or other object to which the bell is attached, and the bell will be set ringing; but by reversing the position of the bell, as shown in Fig. 2, the ball falls through the aperture $c$ into the cup $d$ and the bell is silenced.

The said bell may be secured to a bar or rod, $e$, having a bearing in a clamp, $f$, or other suitable device for attaching the said bell to the handle of a bicycle or to other objects. The end of the said rod may be flattened or bent around parallel with the said rod, so as to retain the rod in its bearing and permit of the said rod being turned in its bearing to the extent of half a revolution, and a spring, $g$, may be arranged to press upon the end of the said rod, so as to retain the bell in either of the positions shown in Figs. 1 and 2, as desired.

I do not, however, limit myself to any particular method of mounting my improved bell or means for reversing the same or holding it in the desired position, as the said bell may be mounted or suspended in any suitable manner which will admit of the position of the bell being readily changed or reversed for the purpose of ringing or silencing it, and any suitable arrangement may be used for holding the bell in the desired position. The said bell may also be provided with any suitable means of attachment to the object upon which it is to be used.

What I claim, and desire to secure by Letters Patent, is—

The combination, substantially as set forth, of the spherical or other suitably-shaped bell $a$, provided with an opening or aperture, $c$, in its upper portion, the ball $b$, and the cup $d$, formed on or fixed to the said bell over the said aperture, the said bell being provided with any suitable mounting or means of attachment to other objects which will admit of its positions being readily reversed, and with any suitable arrangement for retaining the said bell in position for ringing or silence.

THEODORE EDWARD WARE. [L. S.]

Witnesses:
 CHARLES WARE,
  *Bristol, Chartered Accountant.*
 HENRY MORLAND, B. A., Oxon,
  *Glendower House, Clifton.*